(12) United States Patent
Zywiak et al.

(10) Patent No.: US 7,523,622 B2
(45) Date of Patent: Apr. 28, 2009

(54) AIRCRAFT GALLEY CHILLER SYSTEM

(75) Inventors: Thomas Zywiak, Suffield, CT (US);
Louis J. Bruno, Ellington, CT (US);
Diane Drew, Farmington, CT (US);
Douglas L. Christians, Vernon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 745 days.

(21) Appl. No.: 10/946,908

(22) Filed: Sep. 22, 2004

(65) Prior Publication Data

US 2005/0076661 A1 Apr. 14, 2005

Related U.S. Application Data

(63) Continuation-in-part of application No. 10/790,890, filed on Mar. 2, 2004, now Pat. No. 7,024,874.

(60) Provisional application No. 60/504,951, filed on Sep. 22, 2003.

(51) Int. Cl.
*B60H 1/32* (2006.01)

(52) U.S. Cl. .......................... 62/244; 62/434

(58) Field of Classification Search ........... 62/239–244, 62/DIG. 5, 198–200, 506, 430–439
See application file for complete search history.

(56) References Cited

U.S. PATENT DOCUMENTS

| | | | |
|---|---|---|---|
| 2,333,309 A | 11/1943 | Gould | |
| 2,963,879 A | 12/1960 | De Paravicini | |
| 4,263,786 A | 4/1981 | Eng | |
| 4,399,665 A | 8/1983 | Evans et al. | |
| 4,437,320 A | 3/1984 | Eklund | |
| 4,966,005 A | 10/1990 | Cowell et al. | |
| 4,969,509 A | 11/1990 | Merensky | |
| 5,137,230 A | 8/1992 | Coffinberry | |
| 5,369,960 A | 12/1994 | Mueller et al. | |
| 5,491,979 A | 2/1996 | Kull et al. | |
| 5,513,500 A | 5/1996 | Fischer et al. | |
| 5,899,085 A | 5/1999 | Williams | |
| 5,939,800 A | 8/1999 | Artinian et al. | |
| 6,124,646 A | 9/2000 | Artinian et al. | |
| 6,401,473 B1 | 6/2002 | Ng et al. | |

(Continued)

OTHER PUBLICATIONS

Search Rpt. PCT/US2004/031054.

*Primary Examiner*—William E Tapolcai
(74) *Attorney, Agent, or Firm*—Carlson, Gaskey & Olds

(57) ABSTRACT

A galley chiller system for an aircraft includes at least one condenser having a refrigerant fluid. The fluid within the condenser rejects heat to a first surrounding environment. To more efficiently use the condenser of the galley chiller system and reduce the requirement on other cooling systems within an aircraft, the condenser may reject its heat to a desired location using a heat exchanger. The galley chiller system includes at least one evaporator that receives fluid from the condenser. A first evaporator absorbs heat from a galley, which may include a bank of carts. The first evaporator is arranged in ducting that carries cooled air to the carts. A second evaporator may absorb heat from a cabin recirculation air duct of the aircraft cooling system. In this manner, the evaporators of the inventive galley chilling system cools not only the galley carts but also provides supplemental cooling to the aircraft cooling system thereby reducing its cooling requirements.

22 Claims, 8 Drawing Sheets

U.S. PATENT DOCUMENTS

| | | |
|---|---|---|
| 6,845,627 B1 | 1/2005 | Buck |
| 6,880,351 B2 | 4/2005 | Simadiris et al. |
| 2002/0162345 A1 | 11/2002 | Laugt |
| 2003/0042361 A1 | 3/2003 | Simadiris et al. |

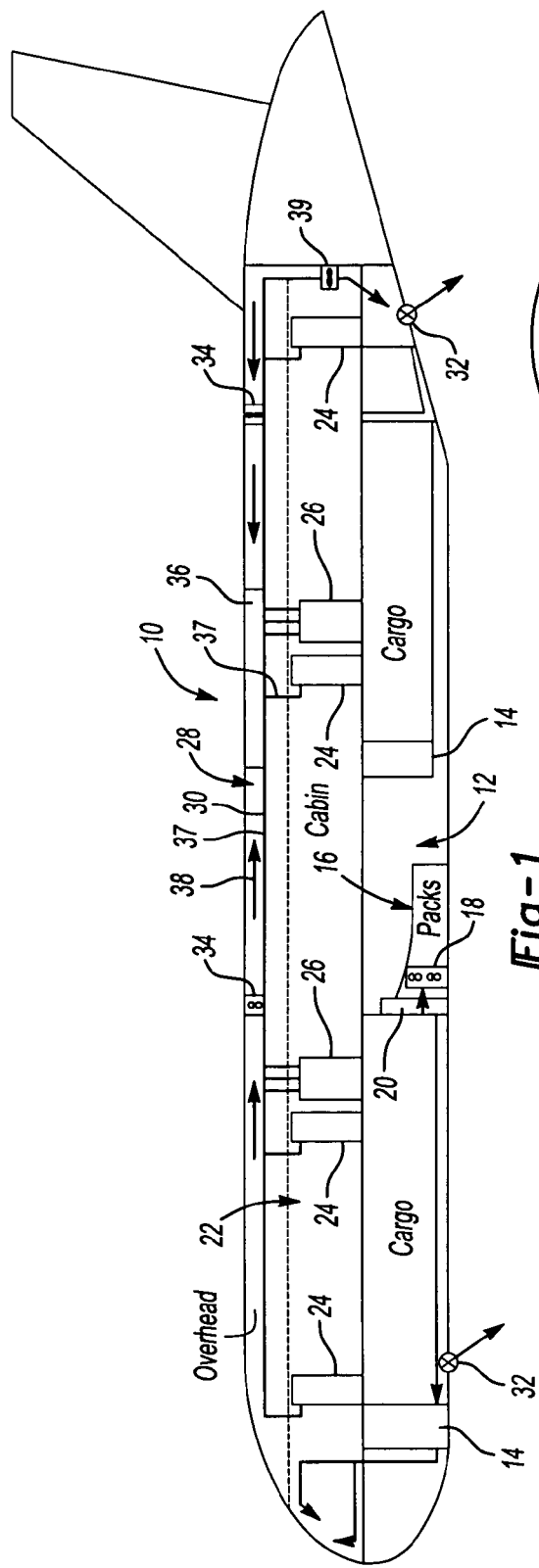
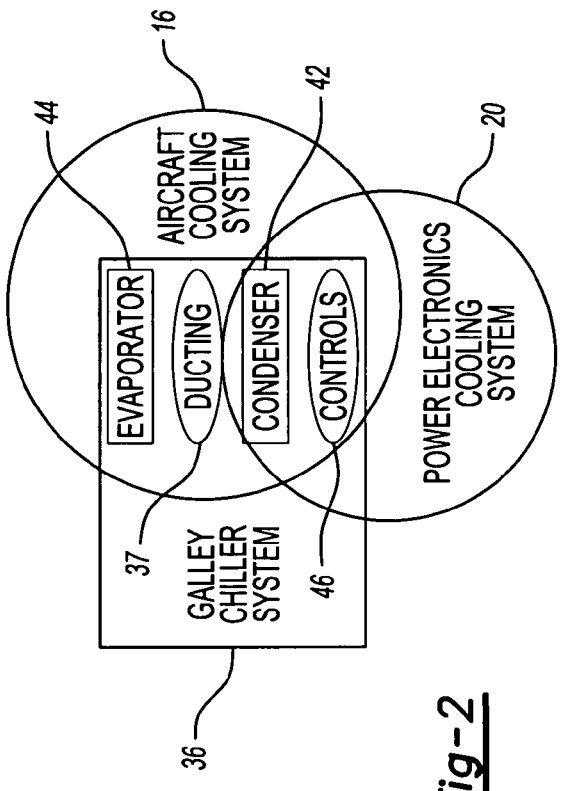
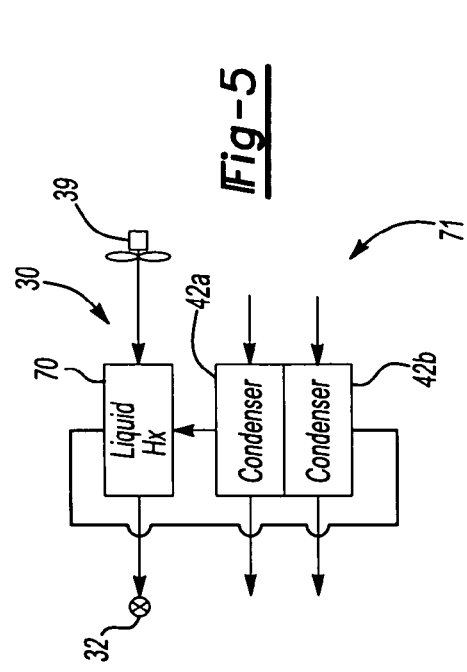

AIRCRAFT GALLEY CHILLER SYSTEM

This application is a Continuation-In-Part of U.S. application Ser. No. 10/790,890 filed Mar. 2, 2004, now U.S. Pat. No. 7,024,874 which claimed priority to U.S. Provisional Patent Application Ser. No. 60/504,951 filed Sep. 22, 2003.

BACKGROUND OF THE INVENTION

The present invention relates to a galley chiller system for use in an aircraft, and more particularly, the invention relates to a more efficient galley chiller system having components shared with other cooling systems of the aircraft.

A typical commercial aircraft includes at least several non-integrated cooling systems. For example, an aircraft cooling system primarily provides cooling for the aircraft cabin area. A power electronics cooling system cools the power electronics of various aircraft systems to maintain the electronics within a desired temperature range. A galley chiller system is dedicated to refrigerating the food carts in the galleys located throughout the aircraft. Each of these systems have a significant weight and power penalty associated to the aircraft. It is desirable to minimize the overall weight and power penalty to the aircraft to increase the overall efficiency of the aircraft.

Typically galley chiller systems are stand alone vapor cycle units. The galley chiller system includes a compressor pumping a refrigeration fluid to a condenser, which rejects heat from the compressed fluid within to the surrounding environment. The fluid from the condenser is regulated through an expansion valve to an evaporator where the refrigerant fluid expands to cool the fluid. The refrigerant fluid within the evaporator absorbs heat from the surrounding environment. The refrigerant fluid flows from the evaporator to the compressor where the cycle begins again.

The location of the galley chiller system condenser is such that typically a portion of the heat from the condenser is rejected to the cabin area, which increases the load on the aircraft cooling system. When the galleys are cooled within the desired temperature range, the galley chiller system may be unused or not operated to its full cooling capacity resulting in inefficiency in the context of aircraft's overall cooling systems.

Therefore, what is needed is a more efficient galley chiller system that more effectively uses the condenser and evaporator to reduce the requirements on the other cooling systems of the aircraft resulting in a reduction in weight and power penalty to the aircraft.

SUMMARY OF THE INVENTION

This invention provides a galley chiller system for an aircraft that includes at least one condenser having a refrigerant fluid. The fluid within the condenser rejects heat to a first surrounding environment. To more efficiently use the condenser of the galley chiller system and reduce the requirements on other cooling systems within an aircraft, the condenser may reject its heat to a power electronics cooling system. Heat from the condenser may be used to heat a cargo area, or may simply be rejected to ram air of an air conditioning pack of the aircraft cooling system or the exhaust air vent.

The galley chiller system also includes at least one evaporator that receives fluid from the condenser. In the embodiment shown, the inventive galley chiller system includes at least two evaporators. A first evaporator absorbs heat from a galley which may include a bank of carts. A second evaporator may absorb heat from a cabin upper recirculation air duct of the aircraft cooling system. In this manner, the evaporators of the inventive galley chilling system cool not only the galley carts but also provides supplemental cooling to the aircraft cooling system thereby reducing its cooling requirements.

The cooling systems of the aircraft may also share some controls to monitor and coordinate the operation of the cooling systems with one another. For example, a controller may be connected to a control valve of the recirculation evaporator to obtain a desirable proportion of refrigerant fluid through the evaporators to adjust the cooling capacity provided to each of the galley carts and upper recirculation air duct. Remotely located heat exchangers may be connected to the condenser or evaporator using air or liquid cooling and arranged throughout the aircraft enabling the condenser to be packaged compactly with the other galley chiller components while still providing heat to other aircraft areas.

Accordingly, this invention provides a more efficient galley chiller system that more effectively uses the condenser and evaporator reducing the requirements on the other cooling systems of the aircraft resulting in a reduction in weight and power penalty to the aircraft.

These and other features of the present invention can be best understood from the following specification and drawings, the following of which is a brief description.

BRIEF DESCRIPTION OF THE DRAWINGS

FIG. 1 is a cross-sectional schematic view of a commercial aircraft.

FIG. 2 is a Venn diagram of cooling systems of an aircraft having the inventive galley chiller system.

FIG. 5 is a schematic view of a portion of the inventive galley chiller system utilizing a heat exchanger in conjunction with the condensers.

DETAILED DESCRIPTION OF THE PREFERRED EMBODIMENT

Figure 3:
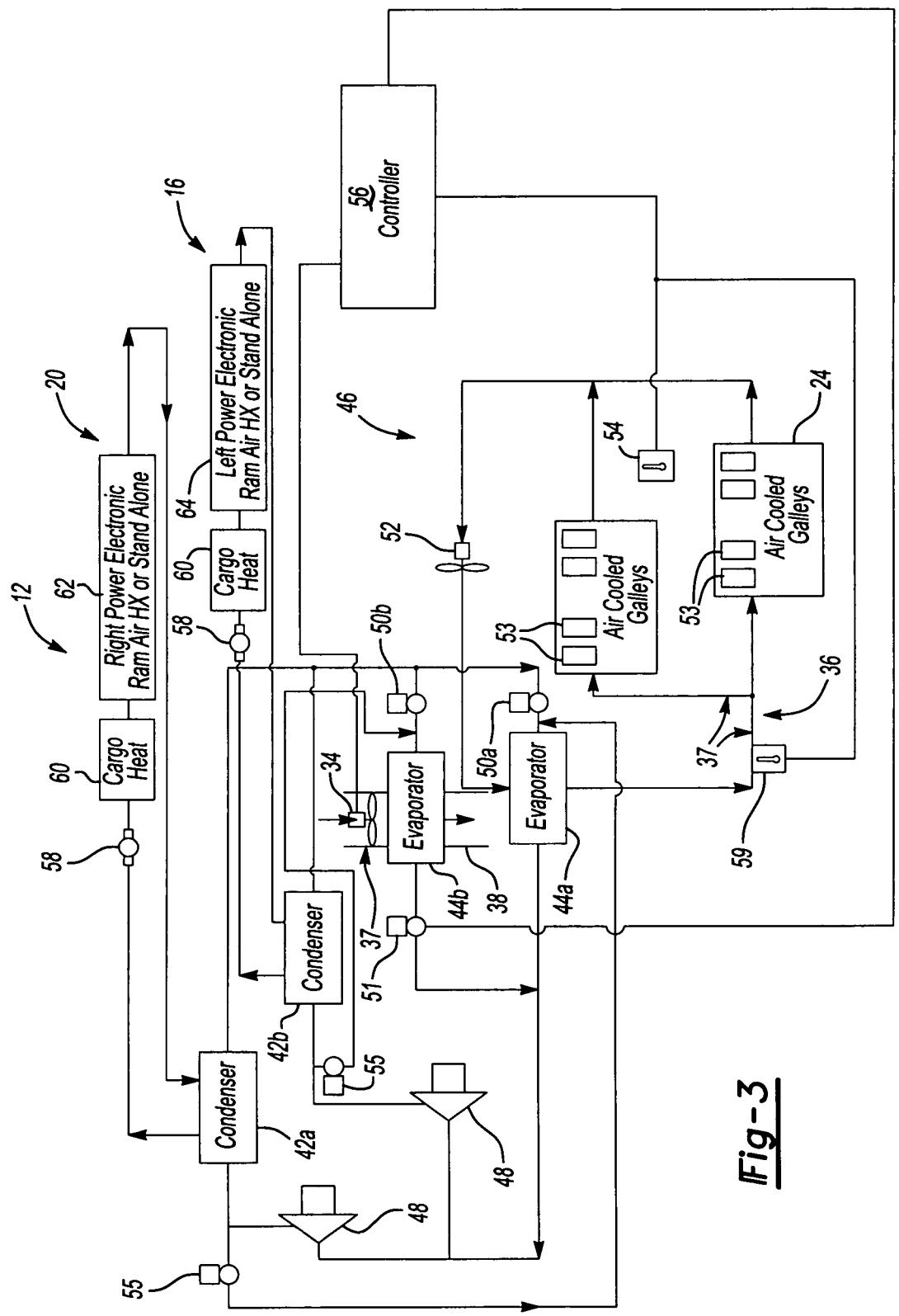
FIG. 3 is a schematic view of one example of a galley chiller system.

A high level schematic cross-sectional view of a commercial aircraft 10 is shown in FIG. 1. The aircraft 10 includes a cargo area 12 within the lower portion of the aircraft 10. The cargo area 12 may include one or more power electronics power bays 14 housing various electronic components used in the control and operation of the aircraft 10. An aircraft cooling system 16 includes one or more air conditioning packs typically located within the cargo area 12. The aircraft cooling system 16 provides temperature conditioned air to a cabin area 22 to provide a comfortable climate for the passengers within the cabin area 22. A power electronics cooling system 20 may also be located within the cargo area 12 to cool the power electronics equipment bay 14.

Galleys 24 are positioned in various convenient locations within the cabin area 22. The galleys 24 house multiple galley carts containing food and other perishable goods. The galleys 24 typically include ducting that delivers cooled air to the carts from a common air source. The galleys 24 and lavatories 26 vent odors to a vent system 30 located in an overhead area 28 located above the cabin area 22. Air from the flight deck, lavatories, galleys and other areas of the aircraft are pumped out the vent system 30 by a fan 39 through an outflow valve 32 exhausting the air to the outside environment.

The inventive galley chiller system 36 is located in the overhead area 28 in the examples shown, although the galley chiller system 36 or components thereof may be located in any suitable area within the aircraft 10. The aircraft cooling system 16 includes ducting 37 having an overhead recirculation air duct 38 located within the overhead area 28, although the recirculation duct may be located elsewhere. The air is delivered from the recirculation air duct 38 by recirculation fans 34. The aircraft cooling system 16 cools the air ducted to the cabin area 22. To reduce the cooling requirement of the aircraft cooling system 16, the inventive galley chiller system 36 provides supplemental cooling to the recirculation air when the cooling capacity of the galley chiller system is not fully needed to cool the galleys 24. This improved efficiency, and other improved efficiency of the cooling systems of the aircraft, is realized by integrating some of the components of the galley chiller system with other aircraft cooling systems, which is represented by the Venn diagram of FIG. 2.

As very schematically depicted in FIG. 2, the galley chiller system 36 includes a condenser 42, an evaporator 44, and controls 46. The galley chiller system 36 may also include ducting 37 for delivering the cooled air from the evaporator 44 or heated air from the condenser 42 to other aircraft cooling systems. These galley chiller system components 36 may be shared by other cooling systems of the aircraft, such as the aircraft cooling system 16 and the power electronics cooling system 20, which will be discussed in more detail below.

One example inventive galley chiller system 36 is shown in FIG. 3. The schematic shown in FIG. 3 may be well suited for a forward located galley cooler system, in addition to other galley locations within the aircraft 10. The galley cooling system 36 includes compressors 48 that compress and pump a refrigerant fluid to condensers 42a and 42b (collectively referred to as "42"), where heat from the compressed fluid within the condensers 42 is rejected to the surrounding environment. The refrigerant fluid then flows to the evaporators 44a and 44b (collectively referred to as "44") through expansion valves 50a and 50b (collectively referred to as "50"). As the fluid exits the expansion valves 50, the fluid expands lowering the temperature of the fluid. The expansion valves 50 control automatically to a desired superheat setpoint. Preferably, the expansion valves 50 control to a superheat low setpoint of approximately between 5-10° F. to maximize cooling capacity from the evaporators 44 without liquid refrigerant slugging the compressors 48.

Heat from the environment surrounding the evaporators 44 is absorbed into the fluid prior to returning to the compressors 48. It may be desirable to provide at least two condensers 42, evaporators 44 and compressors 48 to provide redundancy within the galley chiller system 36. Moreover, as will be appreciated from the discussion below, having multiple condensers 42 and evaporators 44 may better enable the galley chiller system 36 to be more efficiently integrated with other cooling systems of the aircraft 10. Alternatively, it may be desirable to separate the condensers 42 and evaporators 44 (FIGS. 8 and 9) to provide a more manageable size and weight unit.

Figure 6:
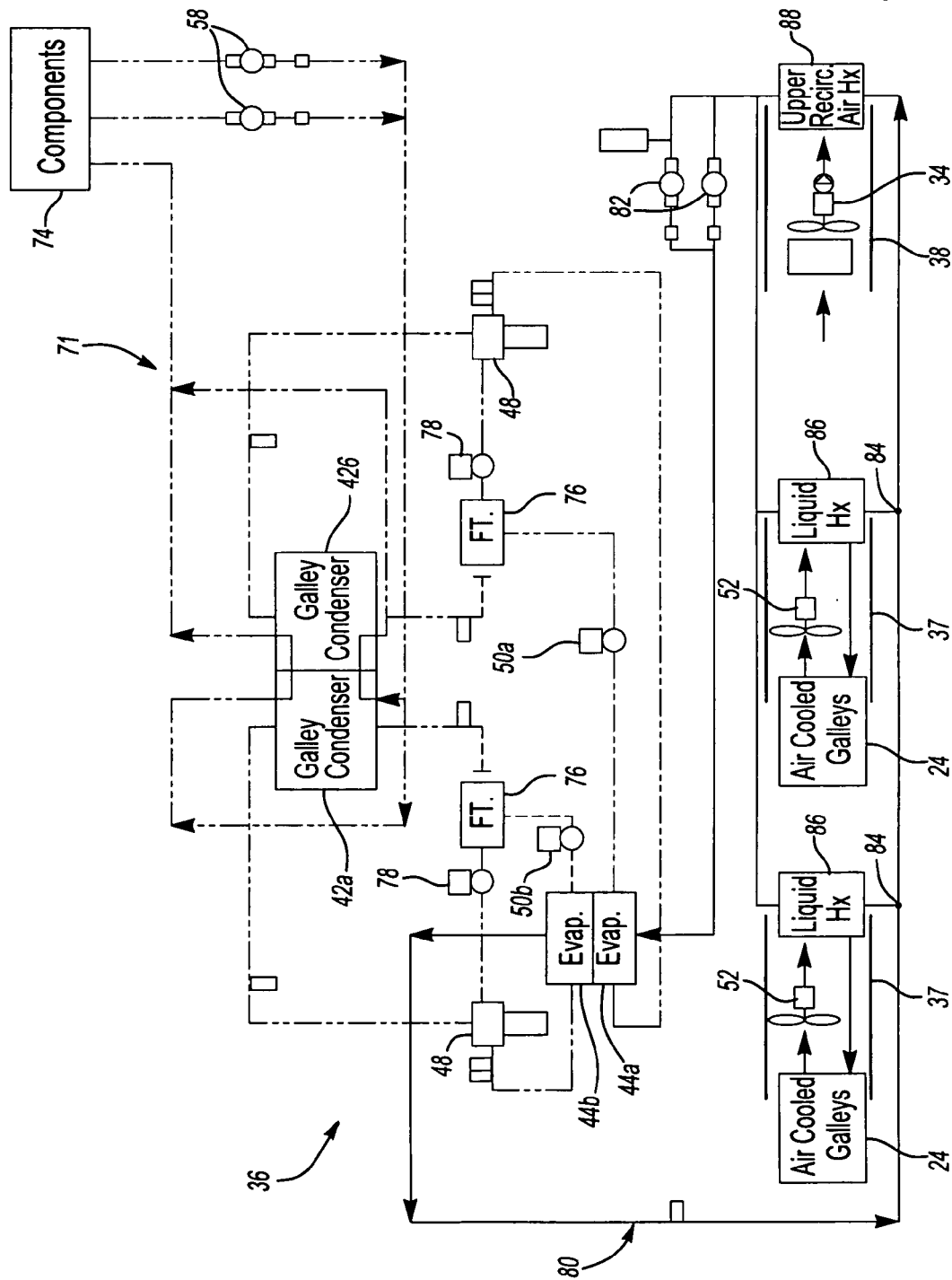
FIG. 6 is a schematic view of another example galley chiller system for the fore of the aircraft.
Figure 7:
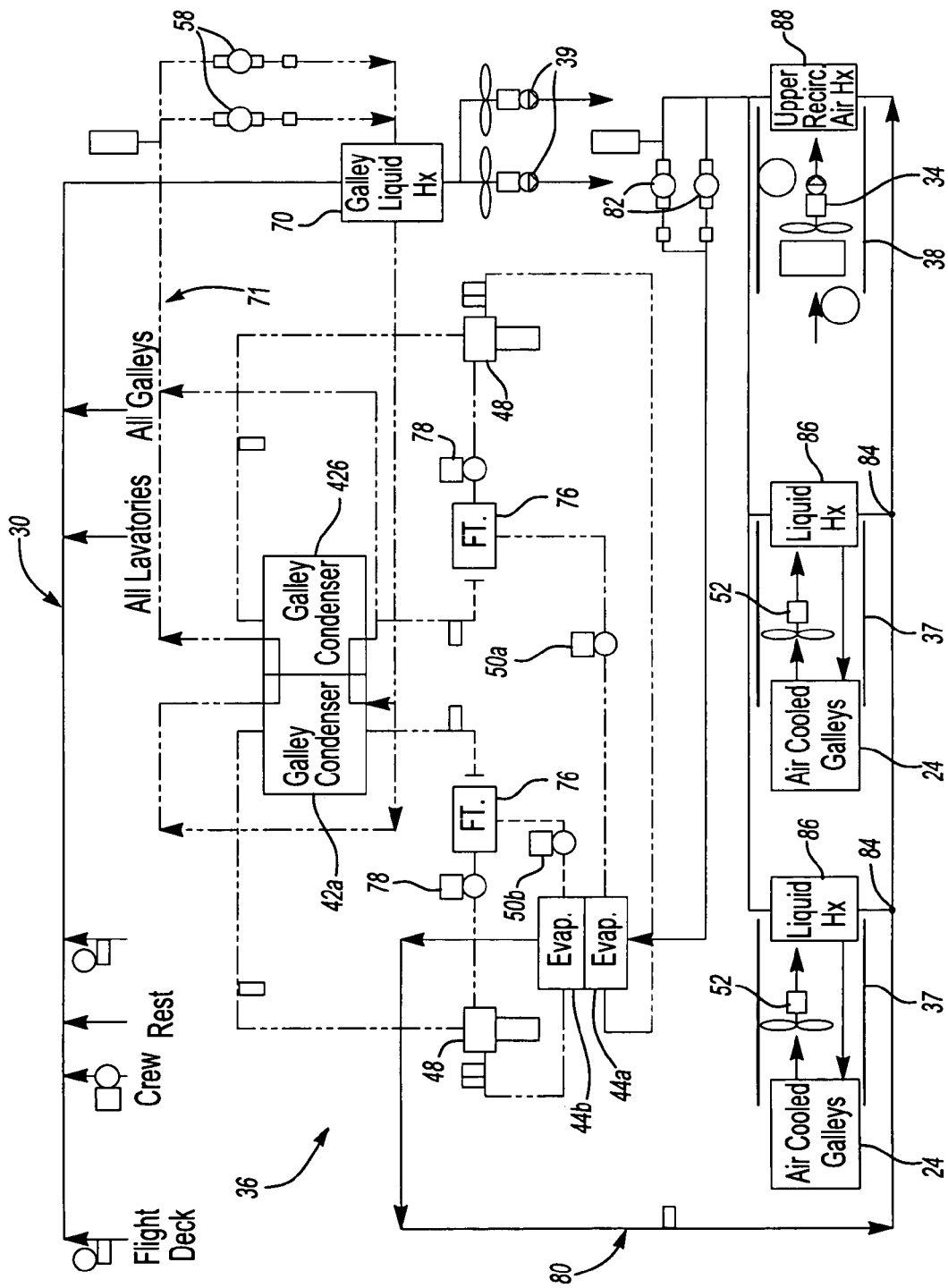
FIG. 7 is a schematic view of another example galley chiller system for the aft of the aircraft.

One evaporator 44a may be arranged within the airflow path of the ducting 37 of the galleys 24, which includes multiple galley carts 53. The air within the ducting 37 is moved through the galleys 24 by a fan 52. The ducting 37 carries the air to one or more galleys 24, where it is distributed to each of the galley carts 53 by a manifold. At least a portion of the ducting 37 is preferably located in the area in which the rest of the galley chiller system 36 is located, such as the overhead area 28. Prior art arrangements require multiple heat exchanges to be connected in a liquid cooling loop with the evaporator. Those heat exchangers are, in turn, arranged within separate ducting for each galley. One inventive arrangement enables a centrally located, common evaporator to be used for multiple galleys and/or carts by placing the evaporator 44a in the ducting 37. Of course, liquid loops may be used to cool the galleys 24 (FIGS. 6 and 7). Furthermore, the liquid loops may be configured with the evaporators 44b from the first and second galley chiller systems, shown at 100 and 102 in FIG. 10, in series.

The evaporator 44a used to cool the galleys 24 may require a cooling capacity sufficient to lower the temperature within the galley carts 53 from approximately 40° F. to approximately 30° F. A second evaporator 44b may be arranged in the flow path of an upper recirculation air duct 38. A fan 34 moves the air within the duct 38 across the evaporator 44b. The evaporator 44b within the upper recirculation air duct 38 may require a cooling capacity sufficient to cool the air from approximately 100° F. to approximately 50° F.

The cooling system controls 46 includes a controller 56 that is directed to a recirculation evaporator control valve 51. The control valve 51 meters the flow of refrigerant fluid into the evaporators. The amount of fluid entering the evaporators corresponds with the cooling capacity for the evaporator. That is, generally, the more refrigerant fluid entering evaporator, the more cooling capacity that is provided by that evaporator. The valve 51 maintains to a minimum pressure to preclude air-side freezing.

The controller 56 coordinates the operation of the control valve 51 based upon, for example, a temperature sensor 54 associated within the galleys 24. The speed of the galley fan 52 is controlled to obtain the required temperature at the galley outlet temperature sensor 54. The temperature sensor 59 measures the temperature at the inlet of the galley 24 or galley carts 53, and the controller 56 determines the amount of refrigerant fluid necessary to flow into the evaporator 44a associated with the galley 24 to ensure that the air is cooled to the desired temperature.

When the air in the galleys 24 is cooled to the desired temperature, the controller 56 may open the control valve 51 associated with the recirculation air evaporator 44b and supplement the cooling of the upper recirculation air provided by the aircraft cooling system 16. Additionally, the valve 55 is used to provide defrost capability for the evaporators 44a and 44b.

With continuing reference to FIG. 3, the condensers 42 reject heat to desired areas of the aircraft 10 to reduce the requirements on other cooling systems of the aircraft. To obtain a more compact galley chiller system 36 and keep the condensers 42 in close proximity to the other galley chiller system components, one or more heat exchangers may be located remotely from the galley chiller system and connected to the condensers by a liquid cooling passage extending in a loop between the heat exchanger and condensers 42.

In one example shown in FIG. 3, a pump 58 pumps a cooling liquid from the condenser 42a to a cargo heat exchanger 60 located within the cargo area 12. Another heat exchanger 62 may be located within the same loop and integrated as part of the power electronics cooling system 20 to reject heat to the aircraft exterior through the RAM system. In another example shown in FIG. 3, another pump 58 may pump a cooling liquid from the condenser 42b to another cargo heat exchanger 60. Another heat exchanger 64 within the same loop may be located within a ram airflow path of an air conditioning pack 18 to reject the hot air to the aircraft exterior.

Figure 4:
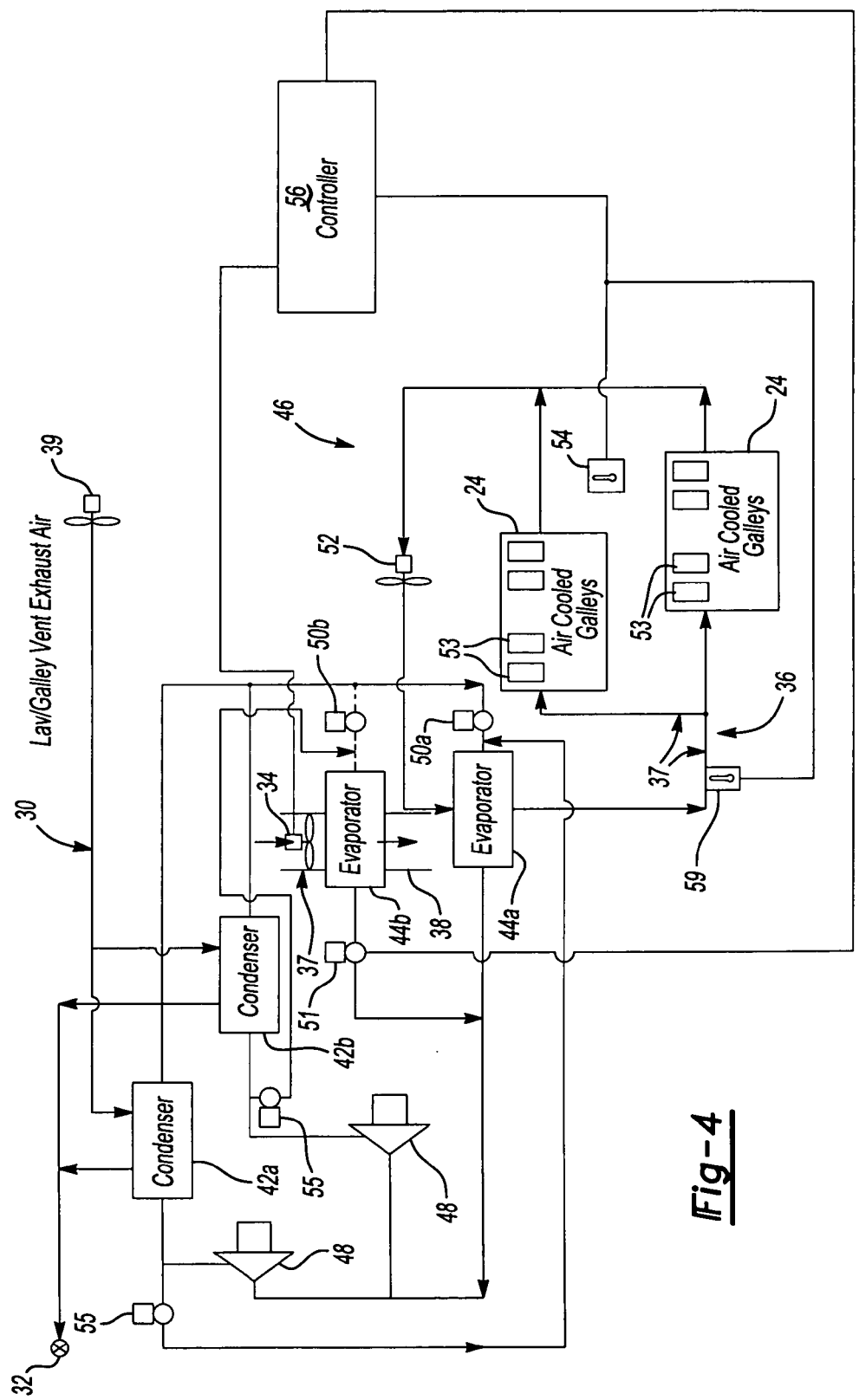
FIG. 4 is a schematic view of another example inventive galley chiller system.

Another example galley chiller system 36 is shown in FIG. 4, which may be suitable for an aft galley chiller system 36 or any other suitable galley location. The operation of the galley chiller system 36 as shown in FIG. 4 is similar to that shown in FIG. 3. However, the condensers 42a and 42b are positioned within the vent system 30 to reject heat to the exhaust air within the vent, which exits the aircraft 10 through the outflow valve 32. To obtain a more compact galley chiller system 36 and keep the condensers 42 in close proximity to the other galley chiller system components, an exhaust air heat exchanger may be located remotely from the galley chiller system and connected to the condensers by a liquid cooling passage 71 extending in a loop between the heat exchanger and condensers 42. For example, FIG. 5 illustrates a heat exchanger 70, which carries liquid heated by the condensers 42, arranged in the vent system 30 to reject heat to the air driven by the fan 39 out the outflow valve 32.

FIGS. 6 and 7 are similar to FIGS. 3 and 4, however, FIGS. 6 and 7 utilize a liquid loop 80 to cool the galleys 24.

Referring to FIG. 6, a liquid condenser loop 71 is used to cool components remote from the condensers 42, such as power electronics. A similar loop is shown in FIGS. 4 and 5.

A flash tank 76 is used to increase the cycle efficiency and reduce the compressor power requirement by up to 20%. The flash tank 76 receives slightly subcooled liquid exiting the condenser 42 through a fixed orifice to throttle the fluid from the condenser 42 to an interstage pressure or midlevel stage of the scroll-type compressor. The throttled liquid from the flash tank 76 flows through a pressure regulator 78 to the compressor 48. Liquid from the flash tank 76 flows through the thermostatic expansion valve 50 to the evaporator 44.

A liquid loop 80 is used in connection with the evaporators 44 to cool the galleys 24. A liquid heat exchangers 86 may be associated with each of the galleys and arranged within the galley ducting 37. A fan 52 blows air through the liquid heat exchanger 86 to cool the galleys 24. Diverter valves 84 may be arranged in the liquid loop 80 to direct the flow of fluid through the liquid loop 80 to as desired based upon the cooling needs of each of the galleys 24.

An aft galley chiller system is shown in FIG. 7. The aft galley chiller system of FIG. 7 is similar to that shown in FIG. 4, however, the galley chiller system 36 includes the liquid loop 80 shown in FIG. 6.

Figure 8:
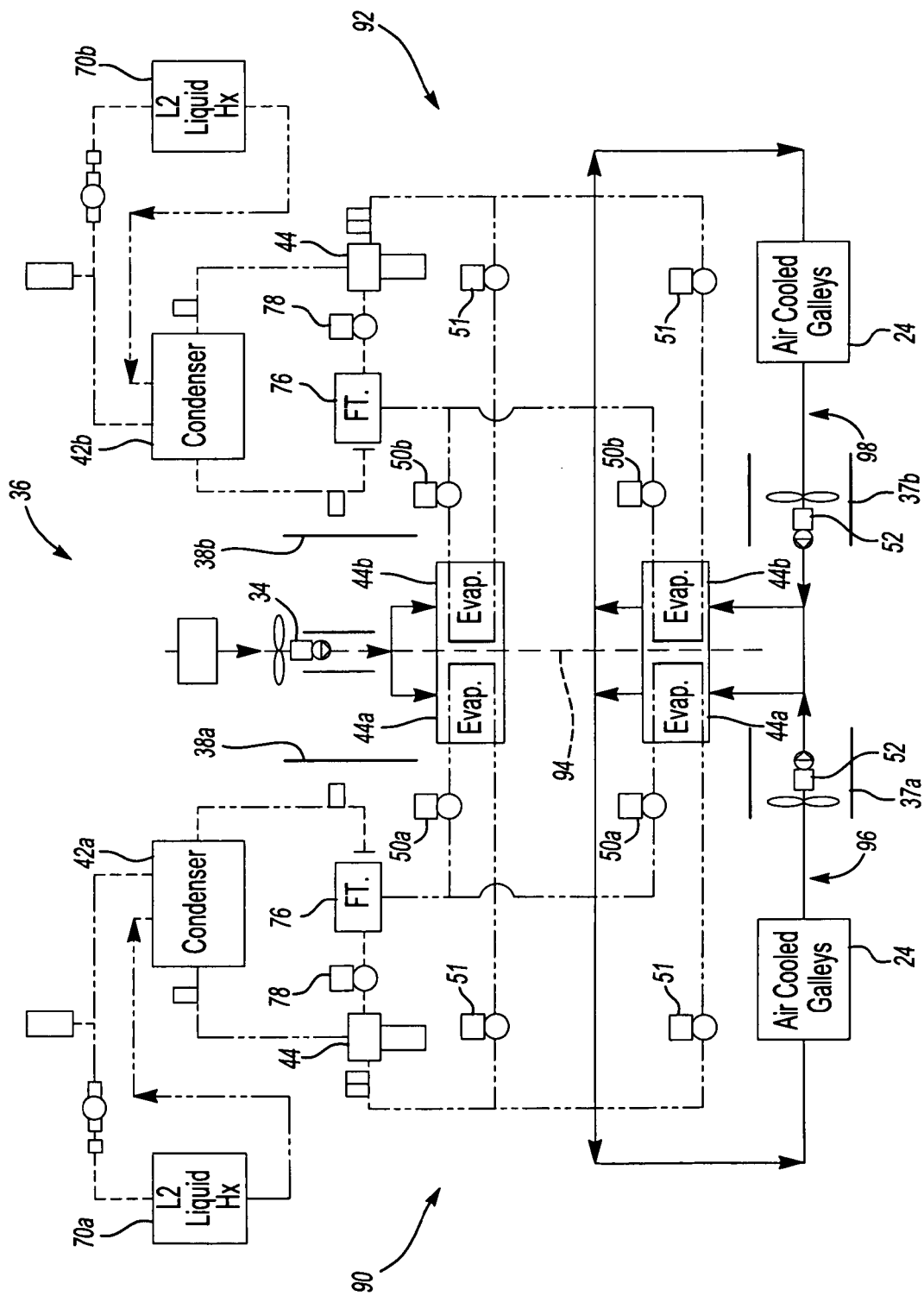
FIG. 8 is still another example galley chiller system for the fore of the aircraft.
Figure 9:
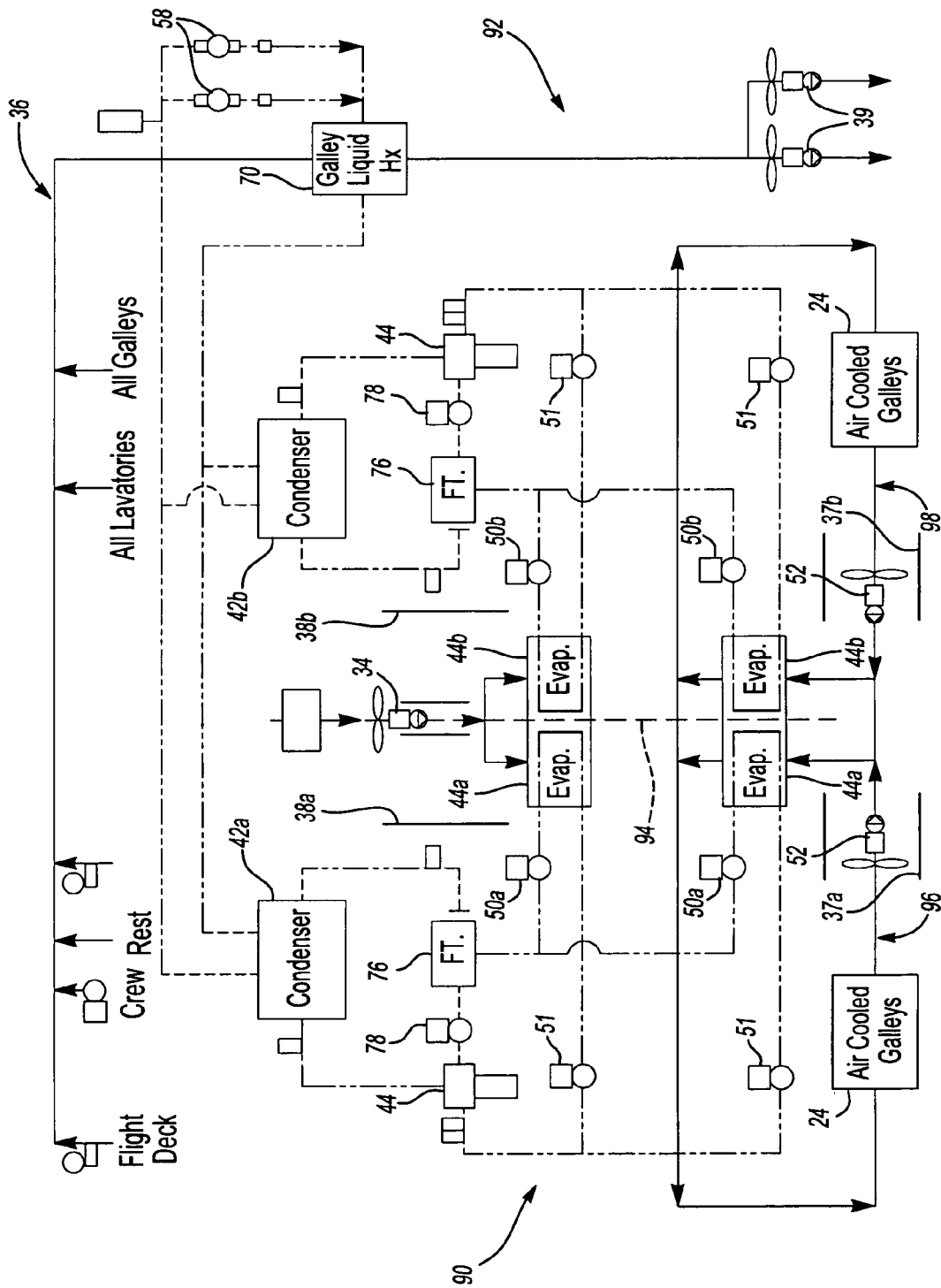
FIG. 9 is a schematic view of still another example galley chiller system for the aft of the aircraft.

Referring to FIGS. 8 and 9, the galley chiller systems 36 shown are similar to those depicted in FIGS. 3 and 4, however, the systems 36 can be divided to provide first and second galley refrigeration units 90 and 92.

The galley chiller systems 36 depicted an FIGS. 3 and 4 include condensers 42a and 42b and evaporators 44a and 44b that are physically combined with one another in one location. The systems shown in FIGS. 3 and 4 provide redundancy within the galley chiller system 36, but results in a bulky, heavy package. As an alternate approach, the galley chiller system 36 may be split into the first and second galley refrigeration units 90 and 92, as schematically depicted by the partition line 94. As a result, each galley refrigeration unit 90 and 92 is approximately half the weight of the system shown in FIGS. 3 and 4, which makes installation and removal of the systems easier. Accordingly, each of the evaporators 44a and 44b are arranged within separate recirculation air ducting 38a and 38b. The evaporators 44a and 44b are also associated with separate galley ducting 37a and 37b.

Figure 10:
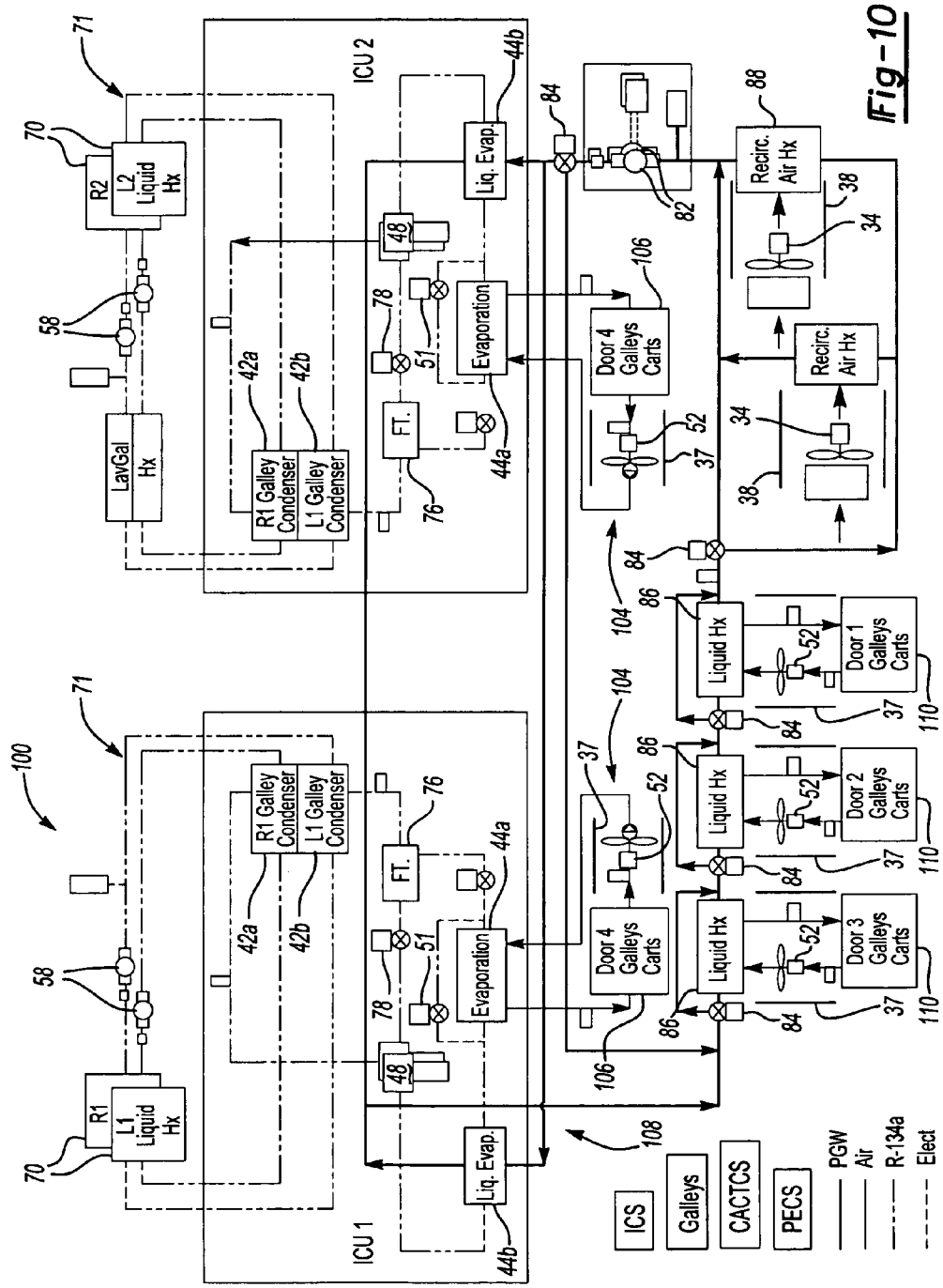
FIG. 10 is a schematic view of yet another example galley chiller system for both the fore and aft of the aircraft.

Referring to FIG. 10, first and second galley chiller systems 100 and 102 are shown. For the example shown, the first and second galley chiller systems 100 and 102 are located in the aft of the aircraft, although they serve both fore and aft galleys. The systems 100 and 102 each include an air cooling galley circuit 104 for cooling first galley 106. The liquid galley cooling circuit 108 cools second galleys 110. However, the liquid heat exchanger 86 of the first and second galley chiller systems 100 and 102 form a series connection providing a liquid galley cooling circuit 108. Controls (not shown) cooperate with the series, liquid galley cooling circuit 108 to regulate the flow of liquid to the heat exchangers 86 since there is a heat build-up within the series circuit 108 as the fluid progresses through the circuit 108. Aside from the series liquid galley cooling circuit 108, the liquid cooling circuit 108 is arranged similarly to that shown in FIGS. 6 and 7.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A galley chiller system for an aircraft comprising:
   at least one condenser having a fluid, said fluid in said at least one condenser rejecting heat to a first surrounding environment;
   at least one evaporator receiving said fluid from at least one condenser, said fluid in said evaporator absorbing heat from a second surrounding environment including a galley cart and a third surrounding environment including an air duct of an aircraft cooling system; and
   a heat exchanger arranged in a galley duct, said heat exchanger including a liquid cooling loop between said heat exchanger and said evaporator, said liquid cooling loop at least partially defining said third surrounding environment.

2. The galley chiller system according to claim 1, comprising a first evaporator absorbing heat from said second surrounding environment, and a second evaporator absorbing heat from said third surrounding environment.

3. The galley chiller system according to claim 1, wherein said air duct is a cabin recirculation air duct.

4. The galley chiller system according to claim 1, wherein said galley chiller system includes at least two evaporators, at least two condensers, and at least one compressor, said condensers fluidly connected to each of said evaporators and said at least one compressor fluidly connected to said condensers.

5. The galley chiller system according to claim 4, wherein said galley chiller system includes first and second galley refrigerant units respectively including one of said at least two evaporators and condensers and another of said at least two evaporators and condensers.

6. The galley chiller system according to claim 1, wherein the air duct is a cabin recirculation air duct.

7. The galley chiller system according to claim 2, comprising a recirculation evaporator control valve and, a controller connected to said control valve controlling a flow of fluid through said control valve into said evaporators to obtain a desired proportion of fluid flow between said evaporators.

8. The galley chiller system according to claim 1, wherein said heat exchanger is arranged in an exhaust air vent, said heat exchanger including a cooling passage extending in a loop between said heat exchanger and said condenser, said cooling passage at least partially defining said first surrounding environment.

9. The galley chiller system according to claim 8, wherein a fan is arranged in said exhaust air vent blowing air from said exhaust air vent through an aircraft outflow valve.

10. The galley chiller system according to claim 1, wherein said heat exchanger includes a liquid cooling passage extending in said liquid cooling loop between said heat exchanger and said condenser, said heat exchanger arranged in a power electronics cooling system in close proximity to a portion of an aircraft electronics system and rejecting heat to said aircraft electronics system.

11. The galley chiller system according to claim 1, wherein said heat exchanger includes a cooling passage extending in said liquid cooling loop between said heat exchanger and said condenser, said heat exchanger arranged in and rejecting heat to a cargo area, and said cooling passage at least partially defining said first surrounding environment.

12. The galley chiller system according to claim 1, wherein said heat exchanger includes a cooling passage extending in said liquid cooling loop between said heat exchanger and said condenser, said heat exchanger located remotely from said condenser transferring heat from said condenser to a remote location of the aircraft.

13. The galley chiller system according to claim 1, wherein said liquid cooling loop is provided between said at least one evaporator and a galley heat exchanger associated with said galley cart, wherein a recirculation air heat exchanger is fluidly connected to said liquid cooling loop, said recirculation heat exchanger arranged in a recirculation air duct.

14. A galley chiller system for an aircraft comprising:
at least one condenser having a fluid, said fluid in said at least one condenser rejecting heat to a first surrounding environment;
at least one evaporator receiving said fluid from at least one condenser, said fluid in said evaporator absorbing heat from a second surrounding environment including a galley cart and a third surrounding environment including air duct of an aircraft cooling system;
wherein said galley chiller system includes at least two evaporators, at least two condensers, and at least one compressor, said condensers fluidly connected to each of said evaporators and said at least one compressor fluidly connected to said condensers;
wherein said galley chiller system includes fire and second galley refrigerant units respectively including one of said at least two evaporators and condensers and another of said at least two evaporators and condensers; and
wherein a liquid cooling loop is provided between said at least two evaporators and at least two galley heat exchangers.

15. The galley chiller system according to claim 14, wherein said at least two evaporators and said at least two galley heat exchangers are connected in series.

16. The galley chiller system according to claim 14, wherein a recirculation air heat exchanger is connected to said liquid cooling loop, said recirculation heat exchanger arranged in a recirculation air duct.

17. The galley chiller system according to claim 14, wherein said at least one evaporator and said at least one condenser are fluidly connected by another cooling loop that is fluidly separated from the liquid cooling loop.

18. A galley chiller system for an aircraft comprising:
at least one condenser having a fluid, said fluid in said at least one condenser rejecting heat to a first surrounding environment;
at least one evaporator receiving said fluid from at least one condense, said fluid in said evaporator absorbing heat from a second surrounding environment;
ducting defining at least a portion of said second surrounding environment, said ducting carrying cooling air in said ducting to a galley cart;
a galley having multiple galley carts, said ducting carrying said cooled air to said multiple galley carts;
multiple galley with said ducting carrying said cooled air to said multiple galleys; and
multiple liquid heat exchangers each of which is respectively associated with said multiple galleys, said multiple liquid heat exchangers connecting in a liquid cooling loop with said at least one evaporator, said at least one evaporator and at least one condenser connected in another cooling loop that is fluidly separated from the liquid cooling loop.

19. The galley chiller system according to claim 18, wherein said liquid loop includes a recirculation air heat exchanger arranged in a recirculation air duct.

20. The galley chiller system according to claim 18, wherein said multiple liquid heat exchangers and said at least one evaporators are connected in series.

21. A galley chiller system for an aircraft comprising:
at least one condenser having a fluid, said fluid in at least one condenser rejecting heat to a first surrounding environment;
at least one evaporator receiving said fluid from at least one condenser, said fluid in said evaporator absorbing heat from a second surrounding environment;
ducting defining at least a portion of said second surrounding environment, said ducting carrying cooled air in said ducting to a galley cart; and
a liquid heat exchanger associated with said galley cart, said liquid heat exchanger connecting in a liquid cooling loop with said at least one evaporator, wherein said liquid loop includes a recirculation air heat exchanger arranged in a recirculation air duct.

22. The galley chiller system according to claim 21, wherein said condenser, said evaporator, and at least a portion of said ducting is arranged in an overhead area of the aircraft.

* * * * *

UNITED STATES PATENT AND TRADEMARK OFFICE
CERTIFICATE OF CORRECTION

PATENT NO. : 7,523,622 B2
APPLICATION NO. : 10/946908
DATED : April 28, 2009
INVENTOR(S) : Zywiak et al.

Page 1 of 1

It is certified that error appears in the above-identified patent and that said Letters Patent is hereby corrected as shown below:

Claim 18, Column 8, Line 12: Change "condense" to "condenser"

Signed and Sealed this

Seventh Day of July, 2009

JOHN DOLL
*Acting Director of the United States Patent and Trademark Office*